United States Patent [19]

Pomeroy et al.

[11] 4,330,696
[45] May 18, 1982

[54] PORTABLE TURNTABLE FOR OVENS

[75] Inventors: James F. Pomeroy, St. Paul, Minn.; Albert E. Colato, Valencia, Calif.; Allen M. Danley, Eagan, Minn.; John E. Gerling, Cupertino, Calif.

[73] Assignee: Plastics, Inc., St. Paul, Minn.

[21] Appl. No.: 131,505

[22] Filed: Mar. 18, 1980

Related U.S. Application Data

[63] Continuation-in-part of Ser. No. 897,048, Apr. 17, 1978, abandoned.

[51] Int. Cl.³ .................. H05B 6/80; A47B 11/00
[52] U.S. Cl. .................. 219/10.55 F; 219/10.55 E; 99/443 R; 108/20; 108/139; 126/338; 248/349
[58] Field of Search ............... 219/10.55 F, 10.55 E, 219/10.55 R, 10.55 D, 10.55 M; 99/423, 427, 443 R, 449; 126/338; 108/139, 142, 20; 312/11, 305; 211/144, 163; 248/349, 522; 274/9 R; 185/38, 39

[56] References Cited

U.S. PATENT DOCUMENTS

| | | | |
|---|---|---|---|
| 176,590 | 4/1876 | Brigham | 185/39 X |
| 274,009 | 3/1883 | Maranville | 126/338 |
| 557,344 | 3/1896 | Shaw | 126/338 |
| 795,806 | 8/1905 | Adelhelm | 185/39 |
| 2,897,746 | 8/1959 | Hilgers | 99/443 |
| 3,177,335 | 4/1965 | Fitzmayer et al. | 219/10.55 F |
| 3,320,396 | 5/1967 | Boehm | 219/10.55 B |
| 3,428,772 | 2/1969 | Wallenfels | 219/10.55 E |
| 3,440,385 | 4/1969 | Smith | 29/10.55 R |
| 3,640,142 | 2/1972 | Stafford et al. | 74/112 |
| 3,731,037 | 5/1973 | Levinson | 219/10.55 E |
| 3,812,316 | 5/1974 | Milburn | 219/10.55 D |
| 3,854,021 | 12/1974 | Moore et al. | 219/10.55 F |
| 3,909,574 | 9/1975 | Muller et al. | 219/10.55 A |
| 4,003,368 | 1/1977 | Maxel | 219/10.55 E |
| 4,036,151 | 7/1977 | Shin | 219/10.55 R |
| 4,038,510 | 7/1977 | White | 219/10.55 E |
| 4,092,512 | 5/1978 | Suzuki et al. | 219/10.55 E |
| 4,121,078 | 10/1978 | Takano et al. | 219/10.55 F |
| 4,137,442 | 1/1979 | Tateda | 219/10.55 D X |
| 4,210,794 | 7/1980 | Oguri | 219/10.55 F |
| 4,216,727 | 8/1980 | Cunningham | 108/20 |
| 4,239,009 | 12/1980 | Cunningham | 108/20 |
| 4,254,319 | 3/1981 | Beh et al. | 219/10.55 F |
| 4,258,630 | 3/1981 | Jorgensen et al. | 108/20 |

FOREIGN PATENT DOCUMENTS

| | | | |
|---|---|---|---|
| 51-150557 | 12/1976 | Japan | 219/10.55 F |
| 52-92454 | 7/1977 | Japan | 219/10.55 F |
| 52-128141 | 9/1977 | Japan | 219/10.55 F |

*Primary Examiner*—B. A. Reynolds
*Assistant Examiner*—Philip H. Leung
*Attorney, Agent, or Firm*—Flehr, Hohbach, Test, Albritton & Herbert

[57] ABSTRACT

Turntable for rotating food being cooked in a microwave oven, including a rotatable platform upon which the food is mounted and a drive motor positioned to the side of the platform. The turntable is made of a material having a low loss tangent at microwave frequencies, and the drive motor is surrounded by a shielding enclosure which reflects microwaves. In one of the disclosed embodiments, the turntable can also be used in conventional ovens.

33 Claims, 12 Drawing Figures

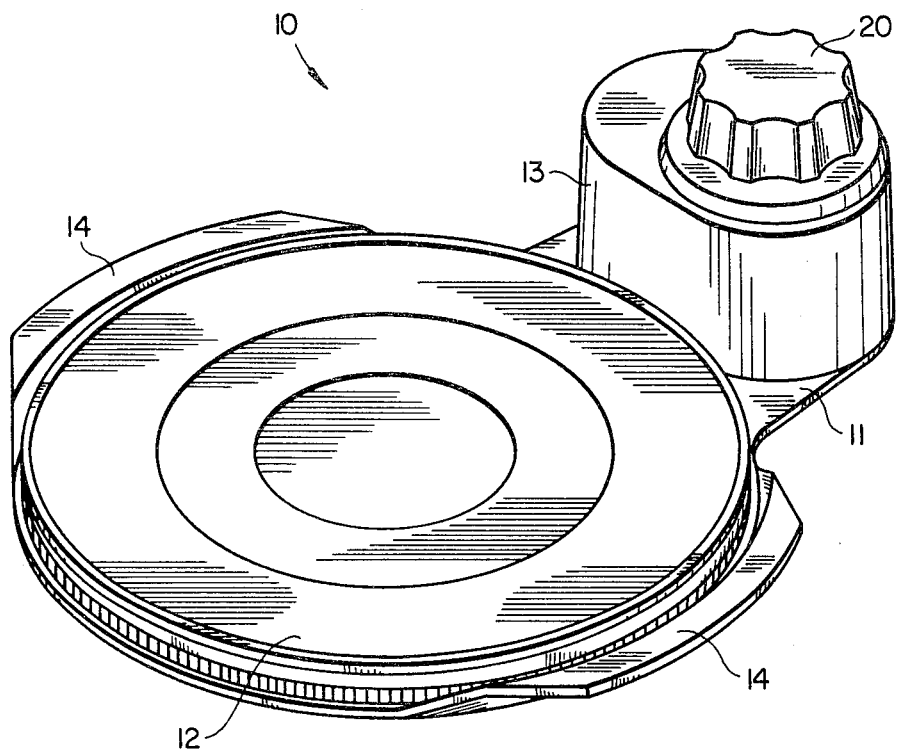
FIG_1
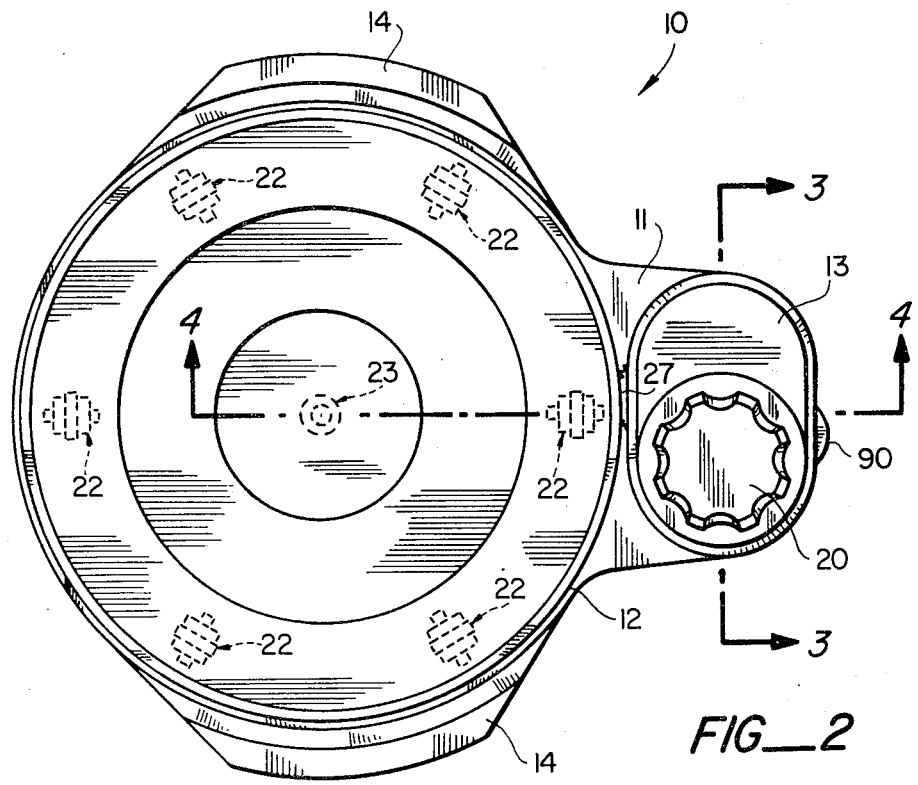
FIG_2

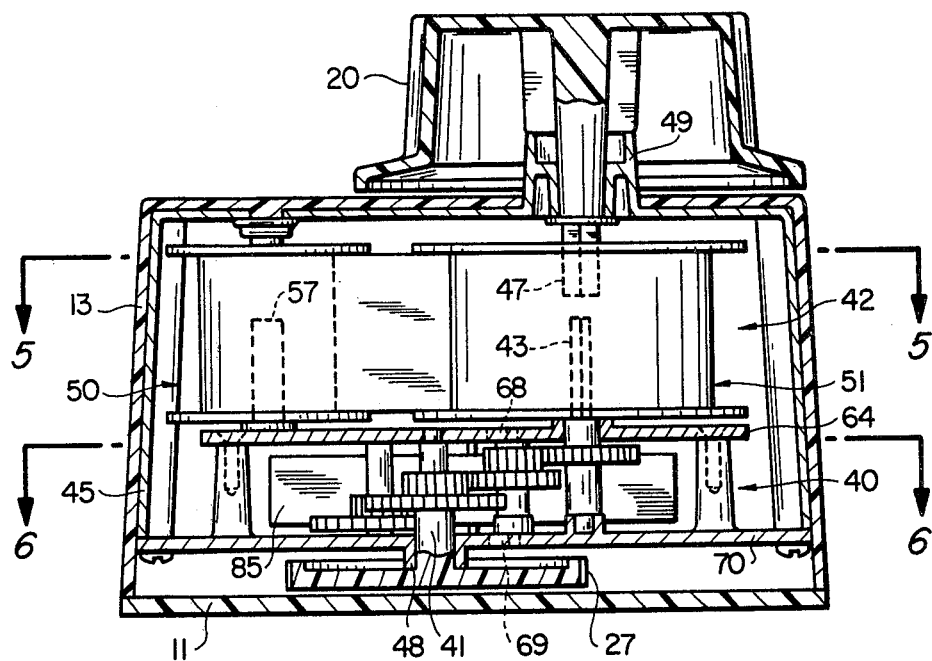
FIG_3
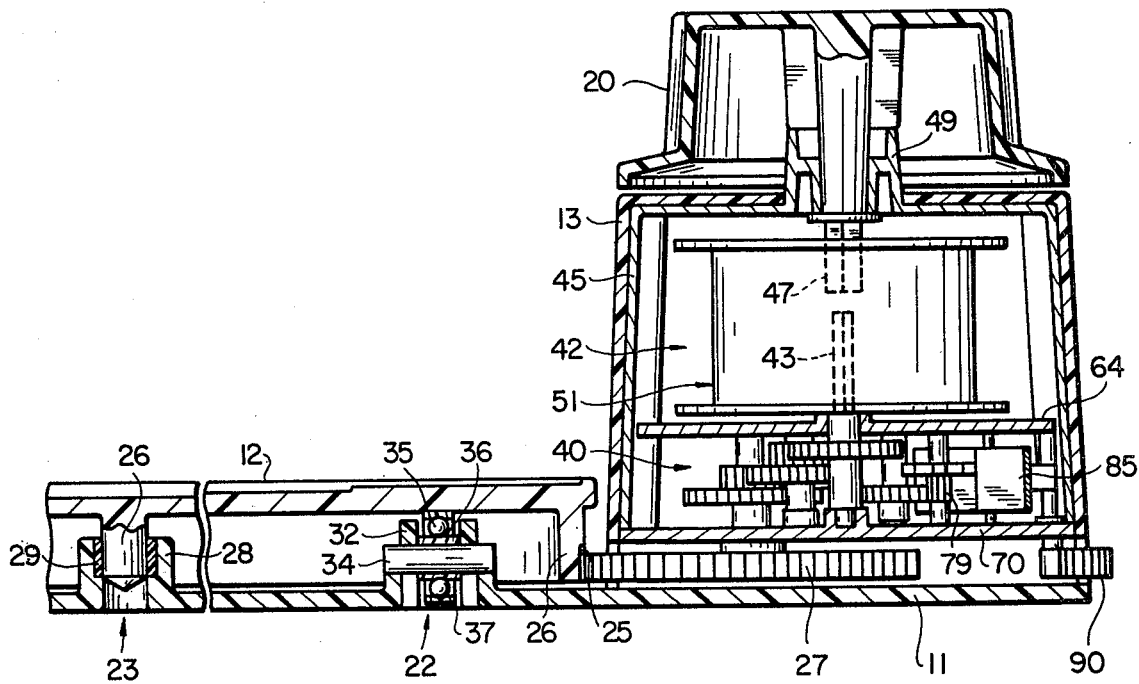
FIG_4

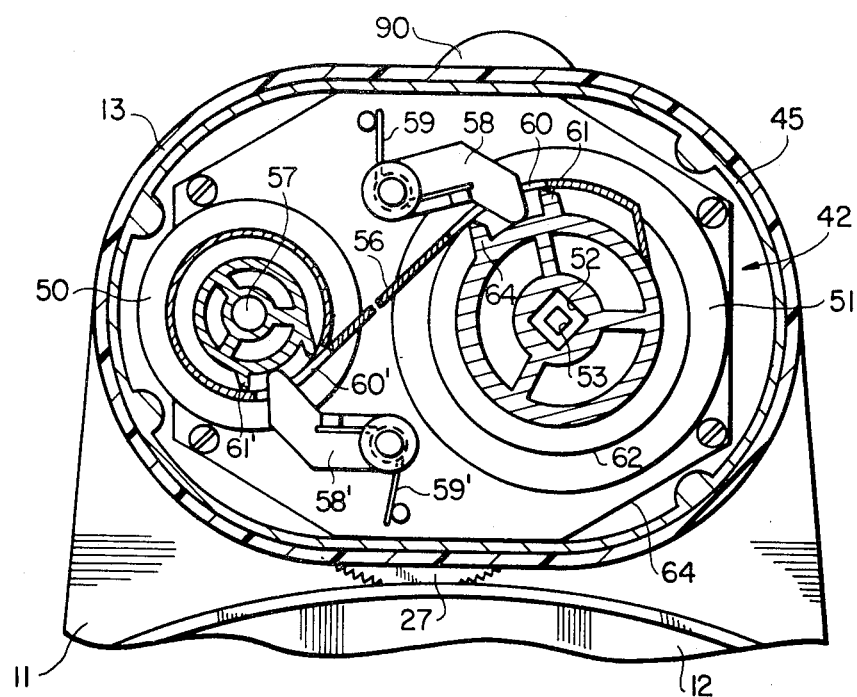
FIG_5
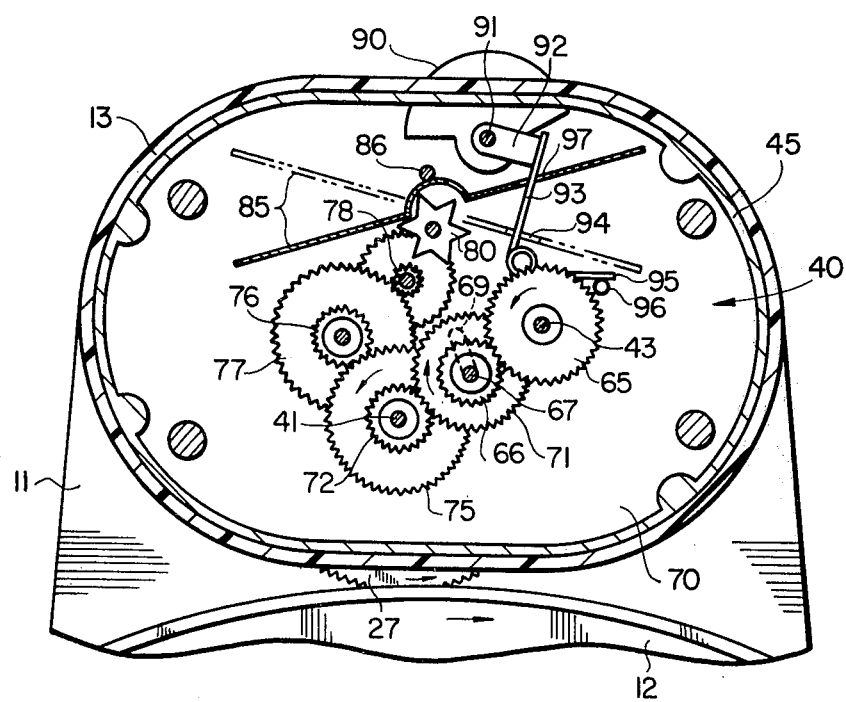
FIG_6

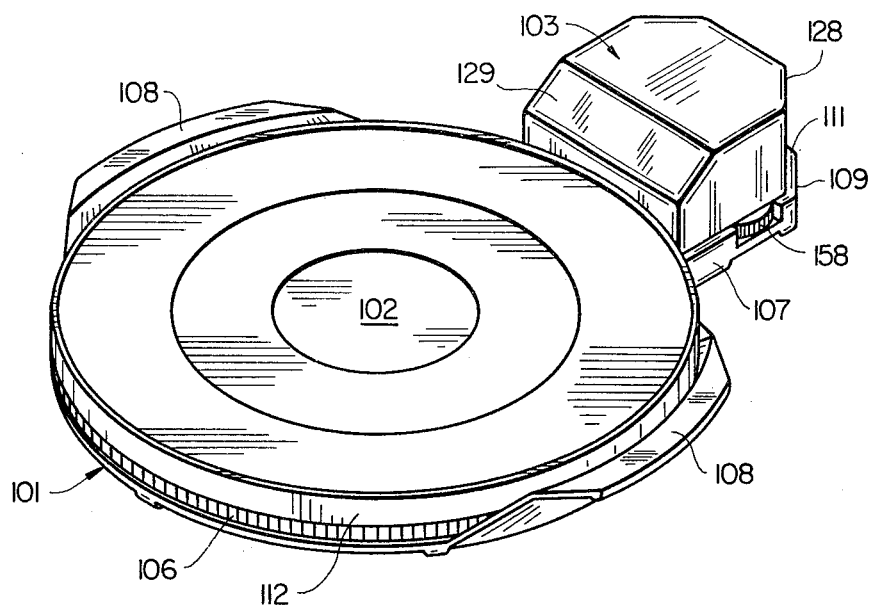
FIG_7
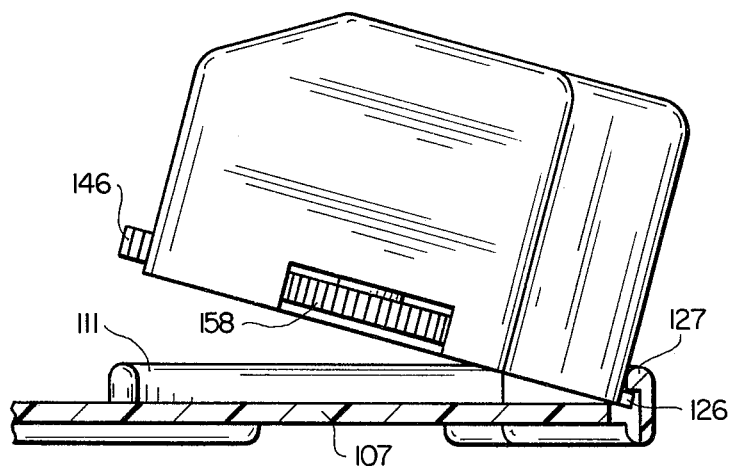
FIG_8A
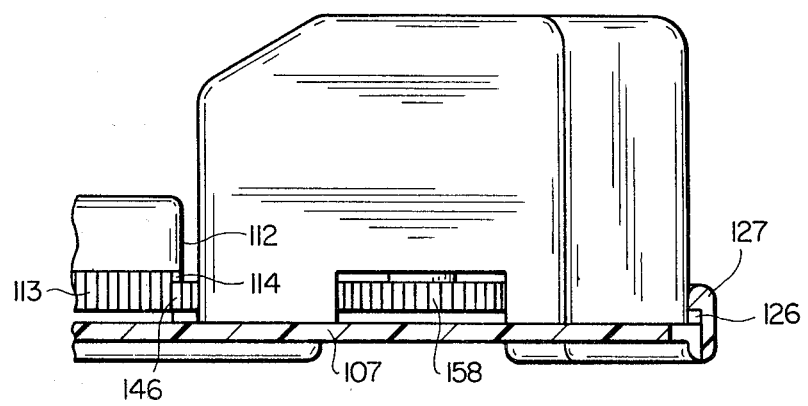
FIG_8B

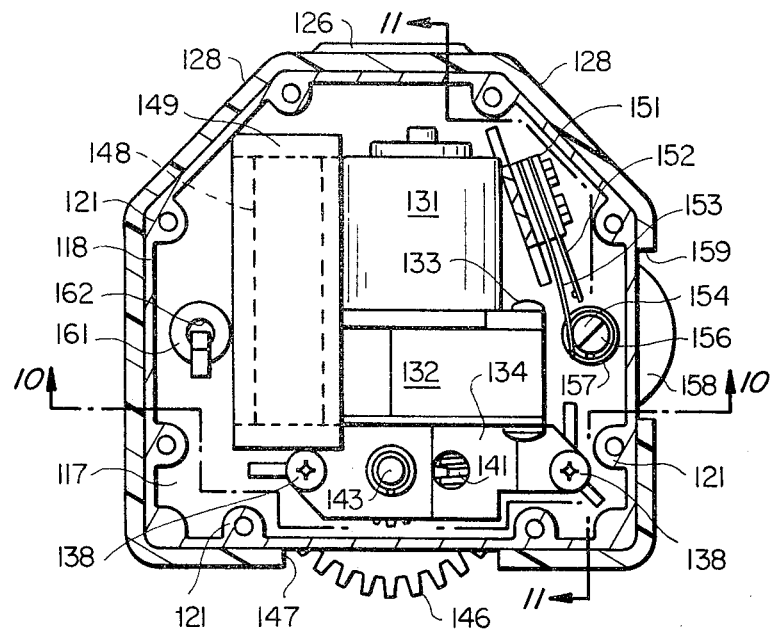
FIG_9
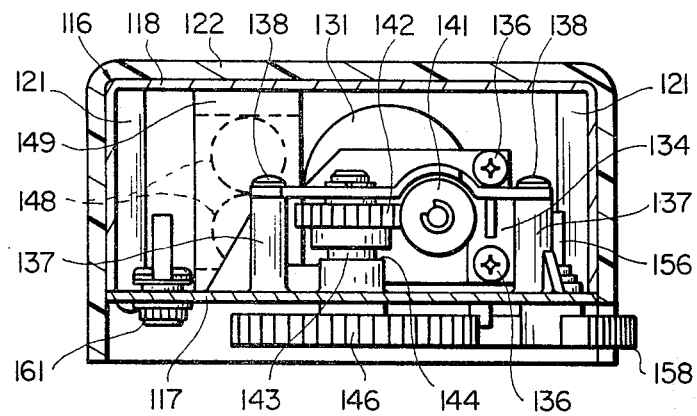
FIG_10
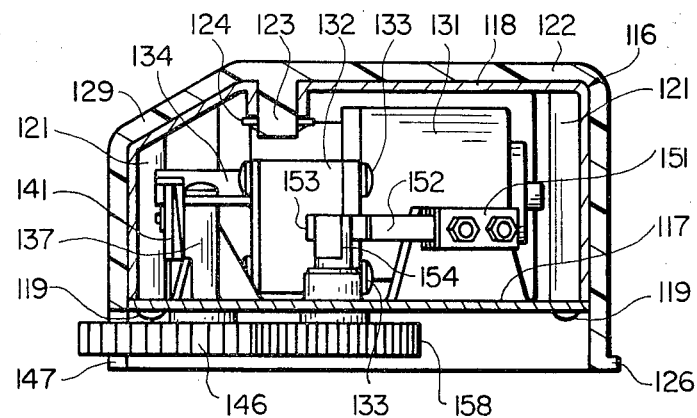
FIG_11

PORTABLE TURNTABLE FOR OVENS

This application is a continuation-in-part of Ser. No. 897,048, filed Apr. 17, 1978, abandoned.

This invention relates generally to cooking apparatus and more particularly to turntables for rotating articles being heated in ovens.

In order to properly cook most foods, it is necessary to heat the food uniformly. Due to uneven energy distribution in microwave ovens, or conventional ovens for that matter, some portions of a food may be overcooked while other portions remain uncooked.

When cooking with microwave ovens, food is placed in a microwave cavity which is essentially a six-walled box. Microwave energy injected into the box is reflected from the walls in a pattern forming hot spots where the microwave fields reinforce and cold spots where the microwave fields are partially cancelled. The action of the mode stirrer within the box and the location of the hot and cold spots tends to differ between ovens even when the ovens are made in the same production run of a given model because even slight changes in dimensions can affect the location of the reinforcing and cancelling microwave fields.

The location of hot and cold spots also changes with the nature of objects placed within the oven. Consequently, changing the food placed in the oven and/or the dish holding the food will shift hot and cold spots. Accordingly, even if the person cooking knows where hot spots are for a given portion of food within a given dish or container, this knowledge will not necessarily help once the food and/or container are changed. This is readily seen because in order to cook, food must absorb microwave energy reflecting within the oven, and different foods having different dimensions will absorb some of reflected waves and not others. Consequently, in some situations reflected microwave fields may be available for reinforcement, whereas in other situations these microwave fields may have been cancelled or absorbed. Containers having dielectric constants greater than air tend to change the effective size of the oven as sensed by the microwave fields. Such containers also tend to change the path of microwave fields in the oven by channeling microwave energy through the container instead of through the air.

Manufacturers of microwave ovens recognize that non-uniform heating is a problem. Consequently, instructions included with many microwave ovens instruct the user to turn the food at certain intervals which may be, for example, one, two, three or five minutes depending on the nature of the foods being cooked. In order to eliminate this inconvenience, there are now microwave ovens available with built-in turntables that slowly rotate food being cooked. There are, however, millions of microwave ovens already in the hands of consumers which do not have turntables. Furthermore, most microwave ovens current being manufactured and sold do not have turntables.

If one is to provide a turntable for use as an accessory for household microwave ovens, there are numerous considerations which must be taken into account in order that the turntable will be both beneficial and safe. In some instances, it may be desirable that the turntable be usable in both microwave and conventional ovens. There is a dichotomy here in that materials which one would normally use for constructing a turntable for operation in a conventional oven whould not necessarily be compatible with the environment of an operating microwave oven. Ordinarily, conventional ovens have an upper temperature limit of about 500° F. Accordingly, one would construct the turntable for operation in a conventional oven from materials such as steel or other metals which resist high temperatures. These materials would disrupt the operation of a microwave oven by interfering substantially with microwave patterns within the oven since they are conductors. On the other hand, most materials which are transparent to microwave fields or have relatively low dielectric constants so as to be compatible with the environment of a microwave oven cannot withstand the 500° F. temperatures of conventional ovens.

It is in general an object of the instant invention to provide a new and improved turntable for use in ovens.

Another object of the invention is to provide a turntable of the above character which is portable and can be used in existing ovens.

Another object of the invention is to provide a turntable of the above character wherein oven walls are not breeched in order to transmit power to the turntable.

Another object of the invention is to provide a turntable of the above character which is so constructed and configured that it does not interfere appreciably with the operation of a microwave oven.

Another object of the invention is to provide a turntable of the above character which is especially suitable for microwave ovens and has a configuration and dimensions suitable for use in existing microwave ovens which are not integrally equipped with turntables.

Another object of the invention is to provide a turntable of the above character which is made of materials that are compatible with the operation of both a microwave oven and a conventional oven and are resistant to chemicals such as detergents which may be used to wash the turntable.

These and other objects are achieved in accordance with the invention by providing a portable turntable having a generally planar base adapted to rest on the floor of the oven cavity, a platform rotatively mounted on the base, and drive means mounted on the base to one side of the platform for rotatively driving the platform. The turntable has a low profile, and the platform is in close proximity to the base, with no drive mechanism beneath either the platform or the base. The drive means includes a shielding enclosure which is reflective to microwave radiation and of a relatively small size suitable for placement in a corner of the oven cavity where it will not interfere appreciably with the distribution of microwave energy within the cavity.

FIG. 1 is a perspective view of one embodiment of a turntable according to the invention.

FIG. 2 is a top plan view of the turntable of FIG. 1.

FIG. 3 is a cross-sectional view taken along line 3—3 of FIG. 2.

FIG. 4 is a cross-sectional view taken along line 4—4 of FIG. 2.

FIG. 5 is a cross-sectional view taken along line 5—5 of FIG. 3.

FIG. 6 is a cross-sectional view taken along line 6—6 of FIG. 3.

FIG. 7 is a perspective view of another embodiment of a turntable according to the invention.

FIGS. 8A and 8B are fragmentary vertical sectional views illustrating the manner in which the drive motor assembly is removably mounted on the turntable base in the embodiment of FIG. 7.

FIG. 9 is a horizontal sectional view of the drive motor assembly of the embodiment of FIG. 7.

FIG. 10 is a cross-sectional view taken along line 10—10 of FIG. 9.

FIG. 11 is a cross-sectional view taken along line 11—11 of FIG. 9.

As illustrated in FIG. 1, the turntable, designated generally by the numeral 10, includes a supporting base 11 upon which a rotatable platform 12 and motor housing 13 are mounted. The base 11 includes a pair of handles 14 projecting from opposite sides thereof for carrying the turntable.

The turntable 10 is configured as a self-powered accessory which can be purchased separately from and used within most microwave ovens not having a turntable integral therewith. In the embodiment of FIG. 1, the drive motor is spring operated, and the spring is wound by a winding knob 20 on the top of the housing, preferably before the turntable is placed in the oven cavity. Upon placing the turntable within an oven and starting operation of the motor, the oven door may be closed without any portion of the turntable extending outside of the oven cavity. This is extremely important with microwave ovens in order to avoid excessive leakage of microwave energy out of the oven so as to expose people to the energy level which is believed to constitute a health hazard. Since the drive motor is a relatively large object which can alter the microwave pattern within the oven cavity, the motor is positioned off to one side of the rotary platform 12 instead of beneath the platform. This permits the drive motor to be positioned adjacent to an inner wall or corner of the oven cavity where its adverse effect on the microwave pattern is minimized.

In order to minimize the effect of the turntable on the environment of microwave ovens, the base 11, platform 12, housing 13 and knob 20 are made of a non-metallic, non-conductive material which has a low loss tangent at microwave frequencies and can withstand temperatures of approximately 500° F. should the turntable also be used in a conventional oven. One preferred material is a modified thermoset polyester such as used in MICROWARE cookware developed by the Plastics, Inc., a subsidiary of Anchor Hocking Corporation. The material is not non-microwave interactive and heat resistive but is also resistant to various chemicals and detergents in which cookware and kitchen applicances are frequently washed. This material is further advantageous in that it does not deform when exposed to relatively high heat, such as that encountered in conventional ovens, and therefore retains its mechanical properties so that moving mechanical elements made therefrom will continue to operate in a high heat environment. Furthermore, a modified polyester will readily accept a variety of colors so that turntables made therefrom can have a pleasing appearance which enhances their commercial appeal. In essence, the modified polyester is a preferred material because it has a low dielectric constant so that microwave interaction is minimized and it has sufficient high heat resistance to withstand prolonged exposure to temperatures of approximately 500° F.

As defined herein, "non-microwave interactive material" means a material which does not substantially affect the microwave field within the cavity. Such materials typically have a dielectric constant of less than about 4 at the frequency of operation of the oven, i.e., 2450 MHz, and a low loss tangent at microwave frequencies.

Referring now to FIG. 2 where the turntable 10 is shown in a plan view, platform 12 is rotatively mounted on the base 11 in a sleeve bearing assembly 23 and supported by a plurality of spaced ball bearing assemblies 22 beneath the platform. Ball bearing assemblies 22 are designed to support a food load of approximately 15 pounds while the sleeve bearing assembly 23 positions the platform 12 on the base 11. The platform 12 has outwardly facing gear teeth 25 formed in a downwardly projecting rim 26 which mesh with a final drive gear 27 projecting from the motor housing 13. The drive gear and platform are generally coplanar, and the turntable has a very low profile. As is seen in FIG. 4, the bearing assembly 23 includes a vertically extending bore 28 with a bearing surface liner 29 that receives an axle 26 projecting downwardly from the platform 12. The bearing assembly 23 constrains the platform 12 for rotation about its axis, with the gear teeth 25 in engagement with the final drive gear 27. If one desires to wash the platform 12 because, for example, food has been spilled on the platform, the platform is simply lifted up vertically off of the supporting ball bearing assemblies 22 until the axle 26 is disengaged from the sleeve bearing assembly. Since the platform 12 is made of a material such as a modified polyester, it can be washed with most household cleaners without any ill effects.

Each of the ball bearing assemblies 22 includes a pair of spaced flanges 32 between which inner and outer ball bearing races 36, 37 are mounted, with a plurality of balls 35 between the inner and outer races. The inner race 36 is mounted on a radially extending axle 34 affixed to the base, while the outer race 37 is in rolling engagement with the lower side of the platform.

As with other portions of the turntable 10, the bearing assemblies are preferably fabricated of a microwave compatible material which will not interact with microwaves in a microwave oven and is also heat resistant so as to withstand the relatively high temperatures, e.g. 500° F., encountered in conventional ovens. It is also necessary for balls 35 to be relatively strong since they support a load while they rotate. Preferably, the balls are made of borosilicate glass, and races 36, 37 are made of a plastic. The plastic must also be a high temperature low dielectric material and may be made from an injection moldable polymide or polyphenylene sulfide material. Likewise, it is preferable to make the axles 34 of a non-metallic material such as a modified thermoset polyester. The use of non-metallic materials throughout the bearing assemblies 22 also eliminates the possibility of arcing between any of these elements and metal objects which may be placed in microwave ovens.

It is also desirable to make all elements of the sleeve assembly 23 from microwave compatible, heat resistant materials. The bore 28 and axle 26 are integral parts of the base 11 and rotatable platform 12, respectively, and are made of a material such as a modified polyester.

Insert 29 is preferably made of a material which has a relatively low coefficient of friction and is microwave compatible and heat resistant. One suitable material is a fiberglass reinforced PTFE (teflon) sold by the Dixon Corporation under the trademark Rulon. Another suitable material for the sleeve bearing is an injection moldable polyamide compounded with a PTFE filler for lubricity.

As seen best in FIGS. 2–6, the final drive gear 27 projects out of the housing 13 and is therefore not shielded by the housing 13. Accordingly, the gear 27 is made of a microwave compatible heat resistant material such as a modified polyester or polyphenylene sulfide and is connected to a gear train 40 within the housing via a shaft 41. The gear train 40 is in turn connected to a spring motor 42 via a shaft 43.

Since the spring motor 42 and gear train 40 are made of a metallic material, they are shielded from the microwave fields in the oven. This is accomplished by mounting the motor 42 and gear train 40 within a metallic enclosure 45 that is heat resistant and reflective to microwaves. The outside of the enclosure is covered with a layer of electrical insulation to reduce arcing to the shield. As is seen in FIG. 3, the shaft 41 of the final drive gear 27 and a shaft 47 from the winding knob 20 project into the housing 13 and shielding enclosure 45 through cut-off tubes 48 and 49, respectively. These tubes are cut-off tubes in that they are smaller in diameter than the smallest diameter that will propagate microwave fields at the frequency of operation of the oven. Tubes 48 and 49 may leak a small amount of energy by a principle other than propagation, and the amount of leakage is a function of the microwave frequency, the dielectric material inside the tube, the diameter of the tube and the length of the tube. In any event, the amount of microwave energy which does enter the motor housing is negligible.

In order to perform satisfactorily as a turntable within a microwave oven, the turntable 10 should for example, be able to rotate a 15 pound load for approximately one-half hour at a rate of about 0.6 revolution per minute. At the same time, the winding force required by the motor should not be so great that the average householder would have difficulty rotating the winding knob 20. In the embodiment of FIGS. 1-6, this is accomplished by using a motor which provides about 5 inch pounds of torque. This is sufficient to rotate the desired load at the desired speed, yet the motor is easily rewound by the householder.

The motor 42 is preferably a constant torque spring motor which utilizes a take-up drum 50 and an output drum 51. The output drum 51 has an upper "input" opening 52 which is square in cross section and receives the square shank of a shaft 47 connected to a knob 20 and a lower "output" opening 53 which is also square in cross section and receives the square shank of the shaft 43 connected to gear train 40. Accordingly, rotation of the winding knob 20 will rotate the drum 51, and rotation of the drum 51 rotates the shaft 43. A stainless steel spring 56 is anchored to the drum 51 and freely coiled about the take-up drum 50 which is itself freely rotatable about an axle 57. As the winding knob 20 is turned so as to rotate the drum 51 clockwise in FIG. 5, the coil spring 56 is progressively transferred from take-up drum 50 to the output drum 51. As the coil spring 56 is transferred, it is first pulled straight as it traverses the space between the drums and is then wrapped back counter to its relaxed configuration around the output drum. Upon releasing the output drum, by disengaging a detent as will be explained hereinafter, the coil spring 56 rewinds around the take-up drum and, while so doing, applies a substantially tangential force to the output drum 51 so as to rotate the output drum. In order to prevent over travel of the spring 56 on either the take-up drum 50 or output drum 51, a pawl 58 is urged by a torsion spring 59 through a slot 60 near the end of the spring 56 to engage a shoulder 61 beneath the winding surface 62 of the output drum. As the spring 56 is wound on the output drum 51, pawl 58 is cammed out of the slot 60 in the spring 56 by a cam 64 and thereafter rests on top of the spring 56. When the spring 56 is completely unwound, the pawl 58 drops back into engagement with the shoulder 61. Take-up drum 50 is likewise equipped with a pawl 58' urged by a torsion spring 59' through a slot 60' in the spring 56 to engage a shoulder 61' beneath the winding surface of the take-up reel 50. As the spring 56 is recoiled onto the take-up reel 50, the pawl 58' is cammed out of the slot 60'.

By mounting the idler gears 66 and 71 so as to move in the slots 68 and 69, the idler gear 71 disengages from output gear 72 when the drive gear 65 is rotated in the clockwise direction upon winding the spring 56 on the drum 51. This is because the shaft 67 is moved to the top of the slot 69 (as seen in FIG. 6) so that the teeth on gear 71 are spaced from the teeth on gear 72. Upon release of the gearing for rotation as the spring 56 unwinds, the drum 51 and drive gear 65 rotate in the counterclockwise direction which urges the idler gears 66 and 71 downwardly and moves the shaft 67 to the bottom of the slot 69 (as seen in FIG. 6). This causes the gear 71 to mesh with output gear 72 so as to drive final drive gear 27.

In order to control the rate at which the gear train transmits torque from the spring motor 42 to the platform 12, the gear train 40 is equipped with a governor which acts directly on the output shaft 41 through a gear 75 which is coaxial with output gear 72 and rigidly connected to the output shaft 41. The gear 75 meshes with an idler gear 76 that in turn is rigidly coaxial with a star wheel 80. As the star wheel 80 rotates, it engages a governor plate 85 which is mounted on a shaft 86 and rocks back and forth between the solid line position and the dotted line position as shown in FIG. 6. The rate at which the governor plate 85 rocks depends upon the length and mass of the governor plate as well as the torque imparted to the governor plate by the star wheel 80. The rate at which plate 85 oscillates therefore determines the rate at which the star wheel 80 rotates and, thus, the rate at which output shaft 41 rotates. In essence, the star wheel and governor plate form an escapement which operates in a fashion somewhat similar to the escapement used in spring powered timepieces.

In order to hold the spring motor 42 in its wound mode so that it can be released to drive the platform 12 at a convenient time, a rotary on/off switch 90 is provided. The on/off switch 90 is mounted on a rotary shaft 91 which has a cam 92 thereon which engages one leg 93 of a torsion spring 94 that has a second leg 95 engaged with a boss 96 projecting from the bottom plate 70 of the shielding enclosure 45. The leg 93 of the torsion spring 94 passes through a slot 97 in the governor plate 85. In the "on" position, which is shown in FIG. 6, cam 92 positions the leg 93 out of engagement with the edge of the slot 97 in the governor 85, thereby allowing the governor 85 to rock or oscillate back and forth. In the "off" position, the cam 92 releases the leg 93 of the torsion spring 94 so that the leg bears against the edge of the slot 97, thereby preventing the governor plate 85 from rocking about shaft 86. In essence, when the governor plate 85 is free to move under the influence of star wheel 80, the wound spring 56 is free to transmit torque through output shaft 41 to the rotary platform 12 via the final drive gear 27.

In order for the motor 51 to deliver the requisite torque for the desired period of time, the gear train 40 is designed with a ratio from the motor output shaft 43 to the gear train output shaft 41 of approximately 2.95–2.97 to 1. The torque on the output shaft 41 is the inverse of this ratio, i.e. approximately 5 inch pounds divided by 2.97, or approximately 1.7 inch pounds. Since the rotation of drum 51 is limited by the governor plate 85 to approximately one revolution per minute, the final drive gear 27 rotates at approximately three revolutions per minute. In order to rotate the rotary platform at approximately 0.6 revolutions per minute, the rotary platform will have a diameter approximately five times that of final drive gear 27.

In order to achieve these rotational speeds, the star wheel makes approximately 160 revolutions for each revolution of drum 51 and its associated shaft 43 and drive gear 65. This results with a torque at the star wheel of approximately 1/160th of 5 inch pounds, or approximately 0.03 inch pounds, which is sufficiently low to minimize wear in the gear train 40 as well as on the governor plate 85.

Since the gears in gear train 40 are within the shielded enclosure 45, they may be made of any convenient material. A preferable material for the gearing is powdered metal which is relatively inexpensive to produce and wears well. The governor plate 85 is preferably made of stainless steel or another material such as steel plated with a corrosion resistant material.

While the embodiment of FIGS. 1–6 can be used in both microwave ovens and conventional ovens, it is also within the scope of this invention to provide a turntable 10 which is made of materials that are compatible with microwave ovens but cannot withstand the temperatures of conventional ovens. In this case, the plastics used for construction of the platform 12, base 11 and other portions of the turntable 10 need only have a relatively low dielectric constant so as to not interact with microwave patterns within the oven, but need not be particularly temperature resistant. Suitable materials for microwave use only include polysulfone, thermoplastic polyesters, polypropylene, polycarbonate, polystyrene, acrylonitrile, butadiene, styrene, polyphenylene oxide, acrylic and polyethylene.

The embodiment of FIGS. 7–11 is generally similar to the embodiment of FIGS. 1–6 and includes a generally planar base 101, a rotatable platform 102 and a drive motor assembly 103. In this embodiment, however, both the platform and the drive motor assembly are removably mounted on the base, and the drive motor assembly is electrically actuated. Operating power is supplied by rechargable batteries, and this embodiment is intended for use in microwave ovens and other environments where operating temperatures do not exceed the safe operating temperature of the batteries.

Base 101 is generally similar to base 11 and includes a generally circular central portion 106 on which the platform is mounted, a flange portion 107 extending outwardly from one side of the central portion for receiving the drive motor assembly, and a pair of handles 108 projecting upwardly and outwardly from opposite sides of the central portion. Flange portion 107 is generally rectangular in plan view and has bevelled outer corners 109 which facilitate placement of the drive motor assembly in a corner of the oven cavity. The flange portion has an upstanding peripheral rim 111 which serves to retain the drive motor laterally in position on the base.

Platform 102 is similar to platform 12 and is mounted on base 101 in the same manner that platform 12 is mounted on base 11 in the embodiment of FIGS. 1–6. Like platform 12, platform 102 includes an outer skirt 112 having a peripheral ring of outwardly facing gear teeth 113 formed in the lower portion thereof. An outwardly projecting shoulder 114 is formed in the skirt above the gear teeth and, as discussed more fully hereinafter, interlocks with the output gear of the drive motor assembly to retain the motor assembly on the base.

Base 101 and platform 102 can be fabricated of any material suitable for use in a microwave oven, i.e. a material having a low loss tangent at microwave frequencies. Any of the materials discussed in connection with the embodiment of FIGS. 1–6 can be employed, and a presently preferred material is a modified thermoset polyester as used in MICROWARE cookware.

The drive motor assembly includes a shielding enclosure or housing 116 fabricated of a metal which is reflective to microwaves. The enclosure includes a bottom plate 117 and a cover 118 which are secured together by screws 119 to provide a microwave-tight enclosure. The screws extend through holes (not shown) in the bottom plate and are threadedly received in vertically extending bosses 121 in the cover.

The outer surface of cover 118 is covered by a rigid shell 122 of electrically insulative material, which reduces arcing to the metallic shield. In one presently preferred embodiment, this shell is fabricated of the same modified polyester as base 101 and platform 102, and the lower portion of the shell extends below bottom plate 117 and rests directly upon the upper surface of flange portion 107 of the turntable base, with bottom plate 117 being spaced above the turntable base. Shell 122 fits closely over cover 118 and is affixed thereto by a post 123 and lockwasher 124.

A flange 126 projects rearwardly from the lower portion of the rear wall of shell 122 and is received beneath a mating flange 127 on rim 111 of the turntable base. As best seen in FIGS. 8A and 8B, flange 127 is formed by cutting away a portion of rim 111.

The motor assembly housing is generally rectangular in plan view, with the vertically extending rear corners 128 being bevelled to facilitate placement of the motor assembly in the corner of the oven cavity. The housing has a low vertical profile to avoid interference with the rotation of containers or other objects which may overhang the sides of the platform. The upper front corner 129 of the housing is bevelled in order to provide additional clearance for objects on the platform.

The drive motor assembly also includes an electrically energized motor 131 and a speed reducing transmission 132 which are mounted inside housing 116. The drive motor and transmission are secured together by screws 133 and affixed to a mounting bracket 134 by screws 136. The mounting bracket is mounted on upright posts 137 on bottom plate 117 and secured thereto by screws 138. A worn gear 141 is affixed to the output shaft of transmission 132 and drives a spur gear 142 on an output shaft 143. This output shaft is rotatively mounted between mounting bracket 134 and bottom plate 117 and extends through a microwave attentuating passageway 144 in the bottom plate. An output gear 146 is mounted on the shaft below plate 117 outside the shielding enclosure. The output shaft and gear are fabricated of a microwave compatible material such as a modified polyester or polyphenylene sulfide and projects through an aperture 147 in outer shell 122 into driving engagement with gear teeth 113 on the turntable platform.

In one presently preferred embodiment, drive motor 131 is a DC motor having an operating speed on the order of 3,000 RPM. This motor includes a built-in transmission having a gear ratio of 300:1, and transmission 132 provides an additional speed reduction of 10:1.

Operating power for the drive motor is provided by batteries 148 which are mounted inside housing 116 adjacent to the drive motor and transmission. The batteries are wrapped in a layer of foam 149 which serves to cushion the batteries and retain them in position between the base plate and cover of the housing. The delivery of current from the batteries to the motor is controlled by an on/off switch 151 having contact arms 151, 153. This switch also includes a cam 154 formed at the upper end of a rotatively mounted shaft 156 in position to bear against contact arm 153 whereby the contacts can be separated. Shaft 156 extends through a microwave attentuating passageway 157 in base 117 of the drive motor housing. A thumbwheel or operating knob 158 is affixed to shaft 156 below bottom plate 117 and projects through an aperature 159 in the side wall of outer shell 122. Since thumbwheel 158 and a portion of shaft 156 are positioned outside the shielding enclosure, these two elements are made of a microwave compatible material.

Power for charging the batteries is supplied by a charger (not shown) through a jack 161 mounted on the bottom plate of the motor housing. The plug opening 162 of the jack is sufficiently small that it will not propagate microwave energy of the wavelength commonly utilized in microwave ovens. In the preferred embodiment, jack 161 is a closed circuit jack which interrupts the circuit between the batteries and the motor when the charger plug is inserted in the jack. The wiring of the batteries, motor, switch and jack is conventional and has been omitted from the drawings for ease of illustration.

Operation and use of the embodiment of FIGS. 7–11 is as follows. The turntable is placed on the floor of the oven cavity of a microwave oven, with drive motor assembly 103 in a corner or other portion of the cavity where it will not interfere appreciably with the distribution of microwave energy within the cavity. The food to be cooked is placed on platform 102, and the drive motor is turned on by switch 151 to rotate the platform.

In this embodiment, the platform and the drive motor assembly interlock to retain the motor assembly on the base. As best illustrated in FIG. 8B, housing flange 126 is captured beneath flange 127 on the turntable base, and output gear 146 is captured beneath shoulder portion 114 of the platform.

The platform can be removed from the base by simply lifting it in an upward direction until the axle of the platform is disengaged from the sleeve bearing of the base. Thereafter, the drive motor assembly can be disengaged from flange 127 and removed from the base. The turntable is reassembled by placing the drive motor assembly on the base with flange 126 under flange 127, then replacing the platform on the base with shoulder 114 above the outer portion of the teeth of output gear 146.

Being mounted on one side of the turntable platform, drive motor assembly 103 can be positioned in the oven cavity where it will provide minimal interference with the distribution of microwave energy within the cavity. In addition, the motor assembly is positioned where food spilled on the platform is not likely to drip onto it, and any food which does get on the motor housing is not likely to enter the assembly since the housing is sealed. Moreover, both the turntable and the motor assembly can be readily removed from the base for cleaning if necessary.

It is apparent from the foregoing that a new and improved turntable for ovens has been provided. While only certain presently preferred embodiments have been described, as will be apparent to those familiar with the art, certain changes and modifications can be made without departing from the scope of the invention as defined by the following claims.

We claim:

1. A portable turntable for use in the cooking cavity of a microwave oven, comprising a generally planar base which rests on the floor of the oven cavity, a generally planar platform including a ring of gear teeth rotatively mounted on the base in close proximity to the floor of the oven cavity with no drive mechanism beneath either the platform or the base, and a drive motor assembly mounted on the upper side of the base to one side of the platform for rotatively driving the platform, said drive motor assembly including an enclosure which is reflective to microwave energy, an output shaft extending through a microwave attenuating passageway in one wall of the enclosure and a drive gear mounted on the shaft outside the enclosure in driving engagement with the gear teeth on the platform, said drive motor assembly being of substantially smaller lateral extent than the platform and being positioned in one corner of the oven cavity.

2. The turntable of claim 1 wherein the base and platform are fabricated of a material having a low loss tangent at microwave frequencies.

3. The turntable of claim 1 wherein the base and platform are fabricated of a material capable of withstanding temperatures on the order of 500° F. so that the turntable can be used in a conventional oven as well as in a microwave oven.

4. The turntable of claim 1 further including a layer of electrically insulative material outside the enclosure for reducing arcing between the enclosure and other structure in the oven.

5. The turntable of claim 1 wherein the drive motor assembly includes an on/off switch having an operating shaft passing through a microwave attenuating passageway in the enclosure.

6. The turntable of claim 1 wherein the drive motor assembly includes an electrically energized drive motor.

7. The turntable of claim 1 wherein the drive motor assembly includes a spring-operated motor.

8. A portable turntable for use in the cooking cavity of a microwave oven, comprising a generally planar base which rests on the floor of the oven cavity, a horizontally extending platform rotatively mounted on the base in close proximity to the floor of the oven cavity with no drive mechanism beneath either the platform or the base, said base and said platform each being fabricated of a material having a low loss tangent at microwave frequencies, and a drive motor assembly mounted on the upper side of the base to one side of the platform for rotatively driving the platform, said drive motor assembly being positioned in a corner of the oven cavity and including a drive motor and a housing of microwave reflective material enclosing the drive motor and forming a microwave-tight enclosure of substantially smaller lateral extent than the platform, said platform and said drive motor assembly being mounted on the base in an interlocking relationship and being readily lifted therefrom.

9. The turntable of claim 8 further including a layer of insulative material covering the outside of the enclosure for reducing arcing between the enclosure and other structure in the oven.

10. The turntable of claim 8 wherein the base and platform are fabricated of a material capable of withstanding temperatures on the order of 500° F. so that the turntable can be used in a conventional oven as well as in a microwave oven.

11. The turntable of claim 8 wherein the drive motor assembly includes an on/off switch having an operating shaft passing through a microwave attenuating passageway in the enclosure.

12. The turntable of claim 8 wherein the platform is mounted on the base by means of a central axle and a plurality of bearings spaced peripherally of the platform and the base.

13. The turntable of claim 8 wherein the drive motor is an electrically energized motor.

14. The turntable of claim 13 further including a battery within the housing for energizing the drive motor.

15. The turntable of claim 8 wherein the drive motor assembly includes an spring-operated motor.

16. A portable turntable for use in the cooking cavity of a microwave oven, comprising a base which rests on the floor of the oven cavity, a platform having a ring of gear teeth rotatively mounted on the base in close proximity to the floor of the oven cavity with no drive mechanism beneath either the platform or the base, said base and said platform each being fabricated of a material having a low loss tangent at a microwave frequencies, a drive motor assembly mounted on the upper side of the base to one side of the turntable and positioned in a corner of the oven cavity, said drive motor assembly including a drive motor and a drive gear driven by the motor in driving engagement with the gear teeth on the platform, said platform and said drive motor assembly resting on the base in an interlocking relationship and being readily lifted therefrom.

17. The turntable of claim 16 wherein the drive motor is mounted in an enclosure which is reflective to microwave energy and of substantially smaller lateral extent than the platform.

18. The turntable of claim 17 further including a layer of insulative material covering the outside of the enclosure for reducing arcing between the enclosure and other structure in the oven.

19. The turntable of claim 16 wherein the base and platform are fabricated of a material capable of withstanding temperatures on the order of 500° F. so that the turntable can be used in conventional oven as well as in a microwave oven.

20. The turntable of claim 16 including an on/off switch connected to the drive motor for actuating the same.

21. The turntable of claim 16 wherein the platform is mounted on the base by means of a central axle and a plurality of bearings spaced peripherally about the platform between the platform and base.

22. The turntable of claim 16 wherein the drive motor comprises an electrically energized motor.

23. The turntable of claim 16 wherein the drive motor comprises a spring-operated motor.

24. A portable turntable for use in the cooking cavity of a microwave oven, comprising a generally planar base which rests on the floor of the oven cavity, a horizontally extending platform having a ring of gear teeth rotatively mounted on the base in close proximity to the floor of the oven cavity with no drive mechanism below either the platform or the base, said base and said platform each being fabricated of a material having a low loss tangent at microwave frequencies, a shielding enclosure reflective to microwave energy mounted on the upper side of the base to one side of the platform, said enclosure being of substantially smaller lateral extent than the platform and being positioned in one corner of the oven cavity, a drive motor mounted in the enclosure, an output shaft driven by the motor extending through a microwave attenuating passageway in one wall of the enclosure, and a drive gear mounted on the shaft outside the enclosure in driving engagement with the gear teeth on the platform.

25. A portable turntable for use in the cooking cavity of a microwave oven, comprising a generally planar base which rests on the floor of the oven cavity, a horizontally extending platform having a ring of gear teeth rotatively mounted on the base in close proximity to the floor of the oven cavity with no drive mechanism below either the platform or the base, said base and said platform each being fabricated of a material having a low loss tangent at microwave frequencies, a drive motor housing mounted on the base to one side of the platform and being fabricated of a material which is reflective to microwave energy, said housing being of substantially smaller lateral extent than the platform and being positioned in one corner of the oven cavity, an electrically energized drive motor enclosed within the housing, an output shaft extending through a microwave attenuating passageway in one wall of the housing, and an output gear mounted on the shaft outside the housing in driving engagement with the gear teeth on the platform for rotation of said platform.

26. The turntable of claim 25 further including a battery mounted in the drive motor housing for energizing the motor.

27. The turntable of claim 25 wherein the platform and motor housing are removably mounted on the base.

28. A portable turntable for use in the cavity of a microwave oven, comprising a generally planar base which rests on the floor of the oven cavity, a rotatable platform removably mounted on the base in close proximity to the floor of the oven cavity with no drive mechanism beneath either the platform or the base, and a drive motor assembly removably mounted on the base to one side of the platform for rotatively driving the platform, said drive motor assembly being of substantially smaller lateral extent than the platform and being positioned in one corner of the oven cavity, said platform and said drive motor assembly being mounted on the base in an interlocking relationship such that the motor assembly is retained on the base by the platform and can be lifted off the base when the platform is removed.

29. A portable turntable for use in the cooking cavity of a microwave oven, comprising a generally planar base which rests on the floor of the oven cavity and is freely removable therefrom, a generally planar platform having a ring of gear teeth rotatively mounted on the base with no drive mechanism beneath either the platform or the base, and drive means mounted on the base to one side of the platform and positioned in one corner of the oven cavity, said drive means including a drive motor, a housing of a microwave reflective material enclosing the drive motor and forming a microwave-tight enclosure of substantially smaller lateral extent than the platform, a microwave attenuating passageway in one wall of the housing, an output shaft extending through the passageway for rotatively driving the platform, an output gear mounted on the shaft outside the housing in driving engagement with the gear teeth on the platform, said base, said platform and said drive means forming a self-contained structure which can be inserted into and removed from the oven cavity as a unit.

30. The turntable of claim 29 wherein the drive motor is electrically energized.

31. A portable turntable for use in the cooking cavity of a microwave oven, comprising a generally planar base which rests on the floor of the oven cavity, a generally planar platform rotatively mounted on the base in close proximity to the floor of the oven cavity with no drive mechanism beneath either the platform or the base, and a drive motor assembly mounted on the upper side of the base to one side of the platform for rotatively driving the platform, said drive motor assembly being of substantially smaller lateral extent than the platform and being positioned in one corner of the oven cavity, said platform and said drive motor assembly resting on the base in an interlocking relationship and being readily lifted therefrom.

32. A portable turntable for use in the cavity of a microwave oven, comprising a generally planar base having a vertically extending bore and resting on the floor of the oven cavity, a rotatable platform removably mounted on the base with a depending central axle received in the vertically extending bore, said platform having a peripheral ring of gear teeth, and a drive motor assembly removably mounted on the base to one side of the platform for rotatively driving the platform, said drive motor assembly including a housing reflective to microwave energy, a flange projecting from the housing and captured beneath a mating flange on the base, a drive motor within the housing, a shaft coupled to the motor and extending through a microwave attenuating passageway in one wall of the housing, and an output gear mounted on the shaft outside the housing, said output gear being in driving engagement with the gear teeth of the platform and restrained from upward movement by the platform, said drive motor assembly being of substantially smaller lateral extent than the platform and being positioned in one corner of the oven cavity.

33. A portable turntable for use in the cooking cavity of a microwave oven, comprising a generally planar base which rests on the floor of the oven cavity and is freely removable therefrom, a generally planar platform rotatively mounted on the base with no drive mechanism beneath either the platform or the base, and drive means mounted on the base to one side of the platform and positioned in one corner of the oven cavity, said drive means including a drive motor, a housing of microwave reflective material enclosing the drive motor and forming a microwave-tight enclosure of substantially smaller lateral extent than the platform, a microwave attenuating passageway in one wall of the housing, an output shaft extending through the passageway for rotatively driving the platform, said base, said platform and said drive means forming a self-contained structure which can be inserted into and removed from the oven cavity as a unit, said platform and said drive means being removable mounted on the base in an interlocking relationship such that the drive means is retained on the base by the platform and can be lifted from the base when the platform is removed.

* * * * *